(12) United States Patent
Bahadur

(10) Patent No.: US 11,846,382 B2
(45) Date of Patent: Dec. 19, 2023

(54) ELIMINATING FOULING IN HYDROCARBON PIPELINES BY ELECTRICAL TECHNIQUES

(71) Applicant: Board of Regents, The University of Texas System, Austin, TX (US)

(72) Inventor: Vaibhav Bahadur, Austin, TX (US)

(73) Assignee: Board of Regents, The University of Texas System, Austin, TX (US)

(*) Notice: Subject to any disclaimer, the term of this patent is extended or adjusted under 35 U.S.C. 154(b) by 1033 days.

(21) Appl. No.: 16/723,992

(22) Filed: Dec. 20, 2019

(65) Prior Publication Data
US 2020/0141530 A1 May 7, 2020

Related U.S. Application Data

(62) Division of application No. 15/124,292, filed as application No. PCT/US2015/020141 on Mar. 12, 2015, now abandoned.
(Continued)

(51) Int. Cl.
*F16L 58/04* (2006.01)
*F16L 58/00* (2006.01)
(Continued)

(52) U.S. Cl.
CPC .............. *F16L 58/04* (2013.01); *B01D 17/06* (2013.01); *C09D 5/00* (2013.01); *C09D 5/16* (2013.01);
(Continued)

(58) Field of Classification Search
CPC ..................................................... B01D 17/06
See application file for complete search history.

(56) References Cited

U.S. PATENT DOCUMENTS 3,478,494 A * 11/1969 Van Luik, Jr. ............ B03C 3/15
210/243
3,567,619 A 3/1971 Brown
(Continued)

FOREIGN PATENT DOCUMENTS

WO 2014018991 A2 1/2014

OTHER PUBLICATIONS

International Preliminary Report on Patentability for International Application No. PCT/US2015/020141 dated Sep. 27, 2016, pp. 1-12.
(Continued)

*Primary Examiner* — Brian W Cohen
(74) *Attorney, Agent, or Firm* — Robert A. Voigt, Jr.; Shackelford, Bowen, McKinley & Norton, LLP

(57) ABSTRACT

A method for eliminating hydrocarbon fouling and reducing pumping power during hydrocarbon transportation. A dielectric layer covers the inner surface of a pipeline for transporting a water-hydrocarbon mixture. A proximity electrode is immersed in the water-hydrocarbon mixture, and an electrical voltage is applied across the dielectric layer. A buffer layer of water is formed on the dielectric layer since water is electrically attracted from the water-hydrocarbon mixture. This water layer, located between the dielectric layer and the water-hydrocarbon mixture, eliminates hydrocarbon fouling on the inner surface of the pipeline or any other internal surface that needs fouling protection. Alternatively, the dielectric layer covers an outer surface of the pipeline and is covered by an external conducting layer. Applying a potential difference between the proximity electrode and the external conducting layer still forms a water buffer layer between the inner surface and the water-hydrocarbon mixture, which eliminates hydrocarbon fouling.

2 Claims, 6 Drawing Sheets

Related U.S. Application Data

(60) Provisional application No. 62/002,255, filed on May 23, 2014, provisional application No. 61/969,310, filed on Mar. 24, 2014.

(51) Int. Cl.
*C09D 5/00* (2006.01)
*B01D 17/06* (2006.01)
*C09D 5/16* (2006.01)
*F17D 5/00* (2006.01)
*C23F 13/06* (2006.01)

(52) U.S. Cl.
CPC .............. *C23F 13/06* (2013.01); *F16L 58/00* (2013.01); *F17D 5/00* (2013.01); *C23F 2213/32* (2013.01)

(56) References Cited

U.S. PATENT DOCUMENTS

| | | | | |
|---|---|---|---|---|
| 4,116,790 A | * | 9/1978 | Prestridge | B01D 17/06 204/674 |
| 2001/0017264 A1 | * | 8/2001 | Klippel | B01D 17/06 204/555 |
| 2003/0155310 A1 | * | 8/2003 | Nilsen | B01D 17/04 210/243 |
| 2004/0144640 A1 | * | 7/2004 | Nilsen | B03C 11/00 204/252 |
| 2004/0211659 A1 | | 10/2004 | Velev | |
| 2007/0102369 A1 | * | 5/2007 | Gramme | B01D 17/0214 166/357 |
| 2010/0112378 A1 | | 5/2010 | Deininger et al. | |
| 2011/0253539 A1 | * | 10/2011 | Akdim | B03C 3/08 210/708 |
| 2013/0186669 A1 | | 7/2013 | Chabas et al. | |
| 2014/0020783 A1 | | 1/2014 | Zazovsky et al. | |
| 2014/0034504 A1 | | 2/2014 | Sams et al. | |

OTHER PUBLICATIONS

Written Opinion for International Application No. PCT/US15/20141 dated Jun. 16, 2015, pp. 1-10.

\* cited by examiner

US 11,846,382 B2

ELIMINATING FOULING IN HYDROCARBON PIPELINES BY ELECTRICAL TECHNIQUES

TECHNICAL FIELD

The present invention relates generally to hydrocarbon fouling and pumping power for pipeline oil transport, and more particularly to eliminating hydrocarbon fouling and reducing the pumping power for pipeline oil transport.

BACKGROUND

Hydrocarbon (organic) fouling in the oil and gas industry is a significant flow assurance concern and has huge implications on efficiency, reliability and safety. Hydrocarbon fouling refers to the accumulation of unwanted material (e.g., asphaltenes, waxes, hydrates, scales, biofoulants, etc.) on solid surfaces (e.g., pipelines, risers, production tubing, valves, chokes, manifolds, separators, surface facilities and in refinery components and heat exchangers) and is a serious operational concern in conventional as well as unconventional (e.g., hydraulic fracturing, deepwater, heavy oil) oil and gas production. Unfortunately, existing fouling mitigation techniques involve the use of environmentally unfriendly chemical inhibitors, mechanical pigging, and expensive monitoring and maintenance operations.

Furthermore, pipelines are the most effective way of transporting hydrocarbons over long distances. However, transporting very high viscosity oil (e.g., heavy oil) necessitates very high pressure drops and pumping power requirements. The currently used technologies to reduce pumping power involve heating pipelines (to reduce the viscosity) or the addition of copious amounts of diluents to the crude stream. Both of these options are expensive to implement and have limited effectiveness.

SUMMARY

In one embodiment of the present invention, a transportation mechanism for transporting hydrocarbons comprises a pipeline for transporting a water-hydrocarbon mixture. The transportation mechanism further comprises a dielectric layer covering an inner surface of the pipeline. The transportation mechanism additionally comprises an electrode mesh covering the dielectric layer, where a potential difference is applied across the dielectric layer established by applying an electrical potential to the electrode mesh and applying an electrical potential to the pipeline. Furthermore, the transportation mechanism comprises a buffer layer of water on top of the dielectric layer, where the water buffer layer comprises water electrically attracted from the water-hydrocarbon mixture by applying the potential difference across the dielectric layer, and where the water buffer layer is located between the electrode mesh and the water-hydrocarbon mixture thereby eliminating hydrocarbon fouling on an inner surface of the pipeline.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

While the following discusses the present invention in connection with eliminating hydrocarbon fouling and reducing the pumping power for pipeline oil transport, the principles of the present invention may be applied to other areas of technology, including, but not limited to, enhanced boiling heat transfer applications (e.g., eliminating film boiling by forcing water to wet the surface), fluid flow applications (enabling annular flows with water electrowetted walls) and nuclear applications (e.g., preventing dryout and controlling instability). A person of ordinary skill in the art would be capable of applying the principles of the present invention to such implementations. Further, embodiments applying the principles of the present invention to such implementations would fall within the scope of the present invention.

Furthermore, it is noted that the principles of the present invention described herein can be applied to protect any internal surface from fouling (e.g., surfaces inside pipelines, tubes, risers, valves, chokes, pumps, heat exchangers) regardless of the shape of the surface. A person of ordinary skill in the art would be capable of applying the principles of the present invention to such implementations. Further, embodiments applying the principles of the present invention to such implementations would fall within the scope of the present invention.

The principles of the present invention describe new methods to prevent fouling and contamination of surfaces by hydrocarbons during oil and gas production, transportation and refining. Hydrocarbon fouling in the oil and gas industry is a significant operational concern and has huge implications on efficiency, reliability and safety. The methods described herein can also be used to reduce the pumping power needed to transport highly viscous oils or other fluids via pipelines.

In one embodiment, the present invention relies on the contrast in the electrical properties of hydrocarbons and water to eliminate hydrocarbon contact with the surface that needs to be protected from fouling. By artificially forcing water to wet the surface (e.g., pipeline inner surfaces), hydrocarbon contact is eliminated (minimized) and the surface stays protected from fouling. Furthermore, in one embodiment, the present invention relies on electrically attracting water to form a water buffer layer at the surface which prevents hydrocarbon molecules from touching the surface. All types of hydrocarbon fouling (e.g., asphaltenes, waxes, hydrates) can be addressed by the methods described herein.

Figure 1:
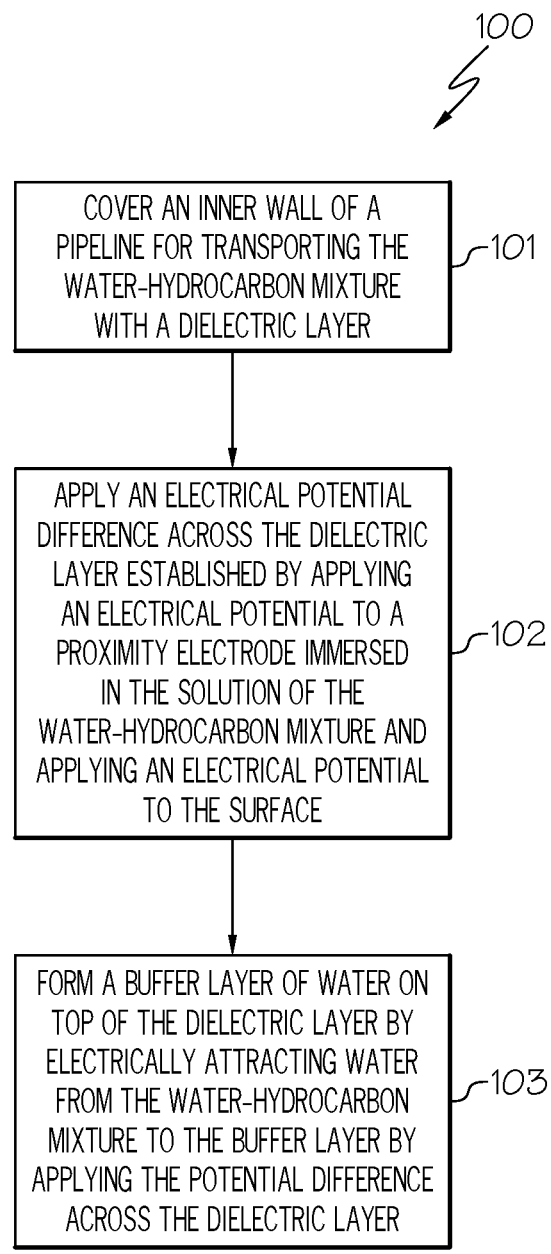
FIG. 1 is a method for preventing hydrocarbon fouling from an oil-water mixture, where the target surface is covered with a dielectric layer, in accordance with an embodiment of the present invention.
Figure 2A:
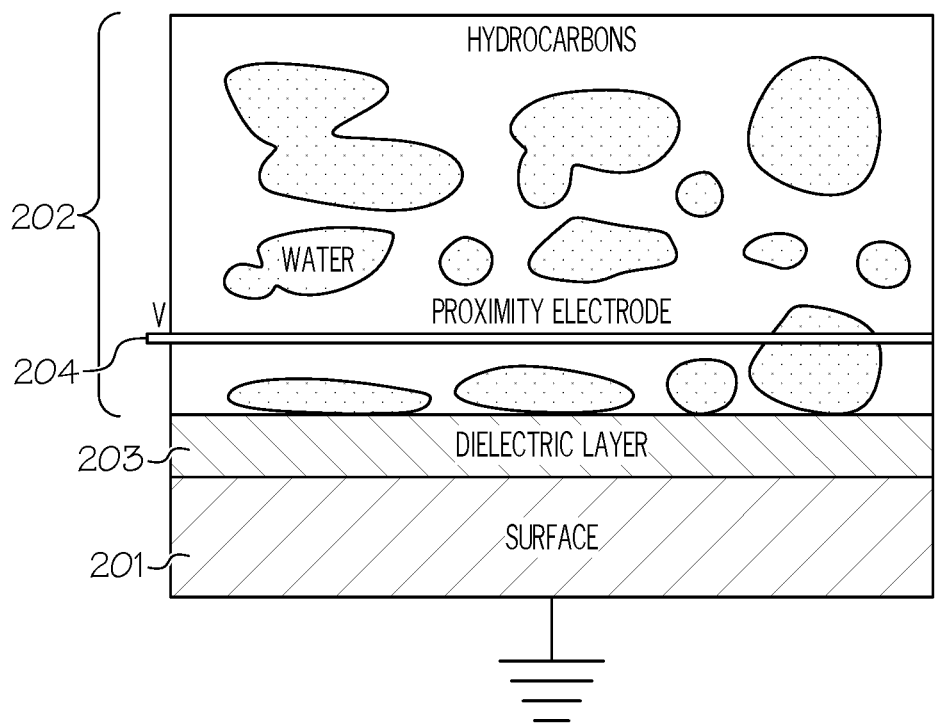
FIG. 2A is a schematic illustrating the method for preventing hydrocarbon fouling from an oil-water mixture, where the target surface is covered with a dielectric layer, in accordance with an embodiment of the present invention.
Figure 2B:
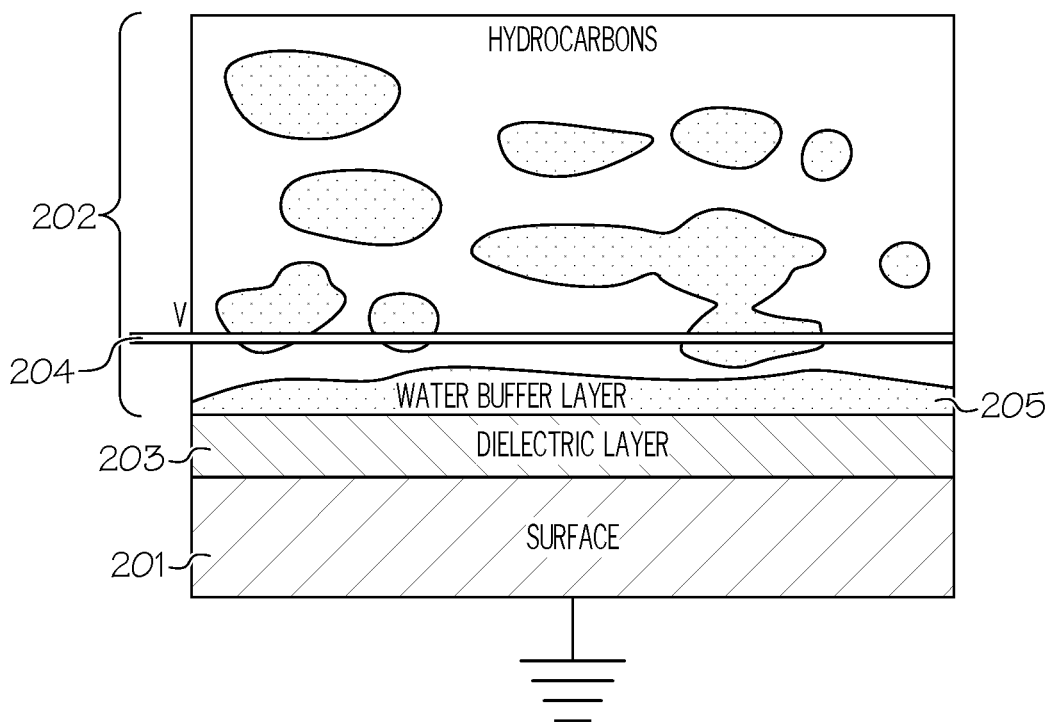
FIG. 2B is a schematic illustrating the application of a potential difference between the substrate and a proximity electrode in the liquid that selectively attracts water towards the surface thereby eliminating hydrocarbon fouling in accordance with an embodiment of the present invention.

Referring now to the Figures, FIG. 1 is a method 100 for preventing hydrocarbon fouling from an oil-water mixture, where the target surface is covered with a dielectric layer, in accordance with an embodiment of the present invention. FIG. 1 will be discussed in conjunction with FIGS. 2A-2B. FIG. 2A is a schematic illustrating the method for preventing hydrocarbon fouling from an oil-water mixture, where the target surface is covered with a dielectric layer, in accordance with an embodiment of the present invention. FIG. 2B is a schematic illustrating the application of a potential difference between the substrate and a proximity electrode in the liquid that selectively attracts water towards the surface thereby eliminating hydrocarbon fouling in accordance with an embodiment of the present invention.

Referring to FIG. 1, in conjunction with FIGS. 2A and 2B, in step 101, an inner wall of a pipeline 201 for transporting a water-hydrocarbon mixture 202 is covered with a dielectric layer 203. As illustrated in FIGS. 2A-2B, a surface 201, such as an inner wall of a pipeline, needs fouling protection from water-hydrocarbon mixture 102 (typical of oil and gas production streams). In one embodiment, surface 201 is covered by dielectric layer 203 (e.g., oxide, polymer, ceramic, etc.). In one embodiment, dielectric layer 203 has a range in thickness from a few nanometers to a few inches depending on the application. Furthermore, dielectric layer 203 can be smooth, textured (rough) naturally or textured artificially. Additionally, the surface energy of dielectric layer 203 can range from very high to very low. Furthermore, the water wettability of dielectric layer 203 can range from superhydrophilic to superhydrophobic. The oil wettability of dielectric layer 203 can range from superoleophilic to superoleophobic. In one embodiment, dielectric layer 203 is made of a single material. In another embodiment, dielectric layer 203 is made from multiple materials. In one embodiment, dielectric layer 203 is multilayered. Furthermore, dielectric layer 203 may be corrosion resistant coating or an antifouling coating.

In step 102, an electrical potential difference is applied across dielectric layer 203 established by applying an electrical potential to a proximity electrode 204 immersed in the solution of the water-hydrocarbon mixture 202 and applying an electrical potential to surface 201. In one embodiment, the applied electrical potential corresponds to a DC voltage (positive or negative) or an AC voltage. Furthermore, the applied electrical potential can be any other complex electrical waveform. In one embodiment, proximity electrode 204 can be continuous (as shown in FIG. 2) or it can be intermittent. Proximity electrode 204 can be axially aligned with pipeline 201 (as shown in FIG. 2) or it could protrude radially into pipeline 201 via electrical feedthroughs. Proximity electrode 204 can be made of any conducting material. Furthermore, multiple proximity electrodes 204, as opposed to a single electrode, could be used to get the same performance and the spacing between the electrodes can vary greatly.

In step 103, a buffer layer 205 is formed of water on top of dielectric layer 203 by electrically attracting water from water-hydrocarbon mixture 202 to buffer layer 205 by applying the potential difference across dielectric layer 203. The externally applied voltage will selectively attract water from the water-hydrocarbon mixture 202 (shown in FIG. 2B) and maximize surface-water contact to form a water rich buffer layer 205 at surface 201.

The formation of this water buffer layer 205 is expected to significantly eliminate the propensity of hydrocarbon fouling on that surface 201. In other words, the application of an electrical voltage will make it energetically unfavorable for hydrocarbon molecules to touch dielectric layer 203. It should be noted that the principles of the present invention described herein can be applied for a variety of hydrocarbons, such as asphaltenes, waxes and hydrates, which have very different electrical properties than water. It should also be noted that the surface to be protected from hydrocarbon fouling requires the attachment of a dielectric layer 203 (which establishes the capacitive system for attracting water). In another embodiment of the present invention, dielectric layer 203 itself has antifouling chemical properties and low surface energy and will further aid the antifouling action of the present invention.

Figure 3:
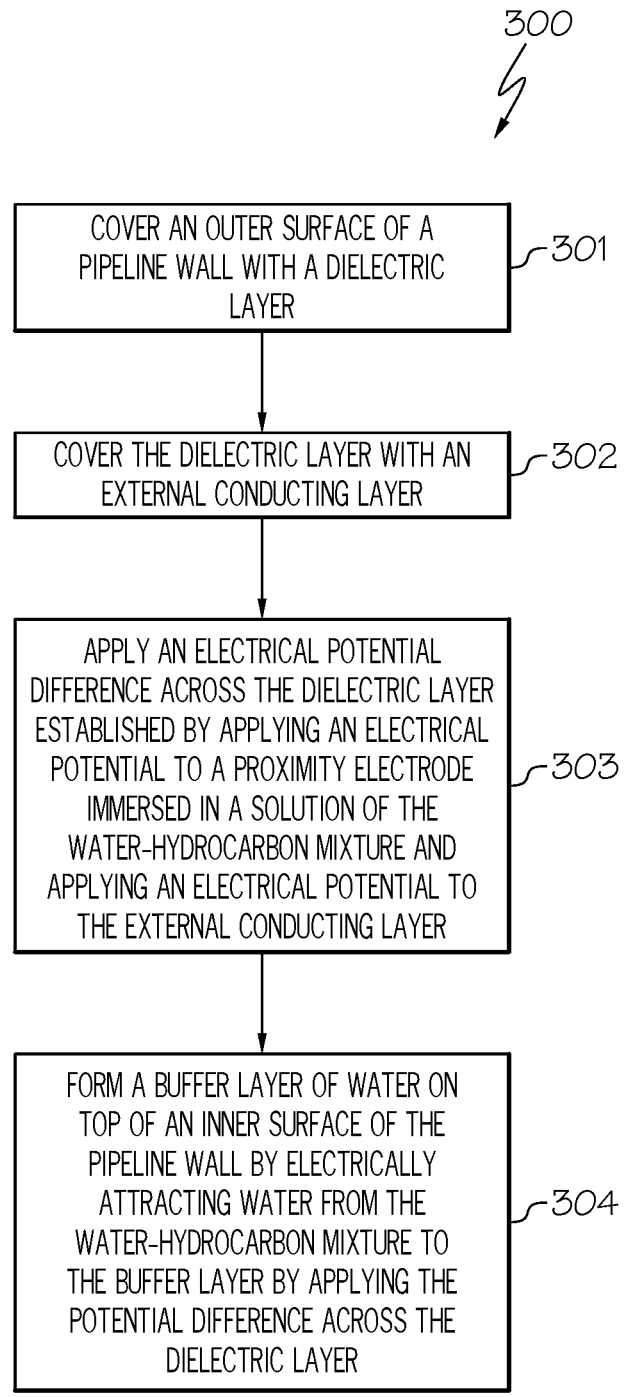
FIG. 3 is an alternative method for preventing hydrocarbon fouling from an oil-water mixture, where the dielectric layer is not required to be placed between the target surface and the hydrocarbon-water mixture, in accordance with an embodiment of the present invention.
Figure 4A:
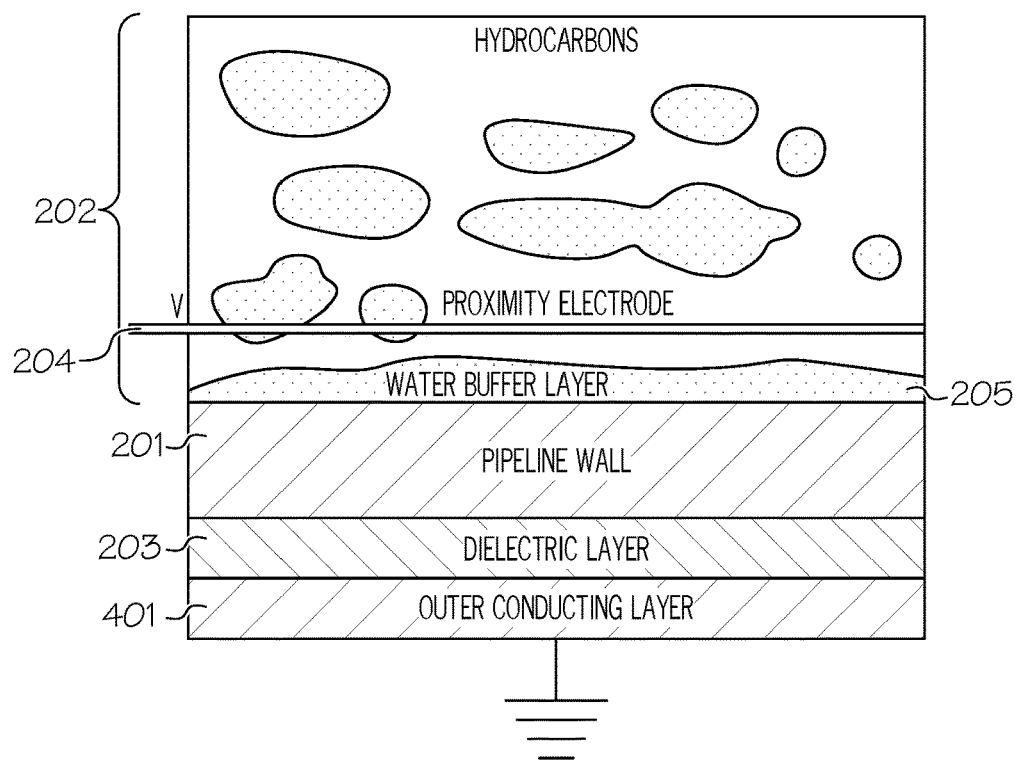
FIG. 4A is a schematic illustrating an alternative embodiment in which the dielectric layer is not coated on the target internal surface, but instead, on the corresponding external surface in accordance with an embodiment of the present invention.
Figure 4B:
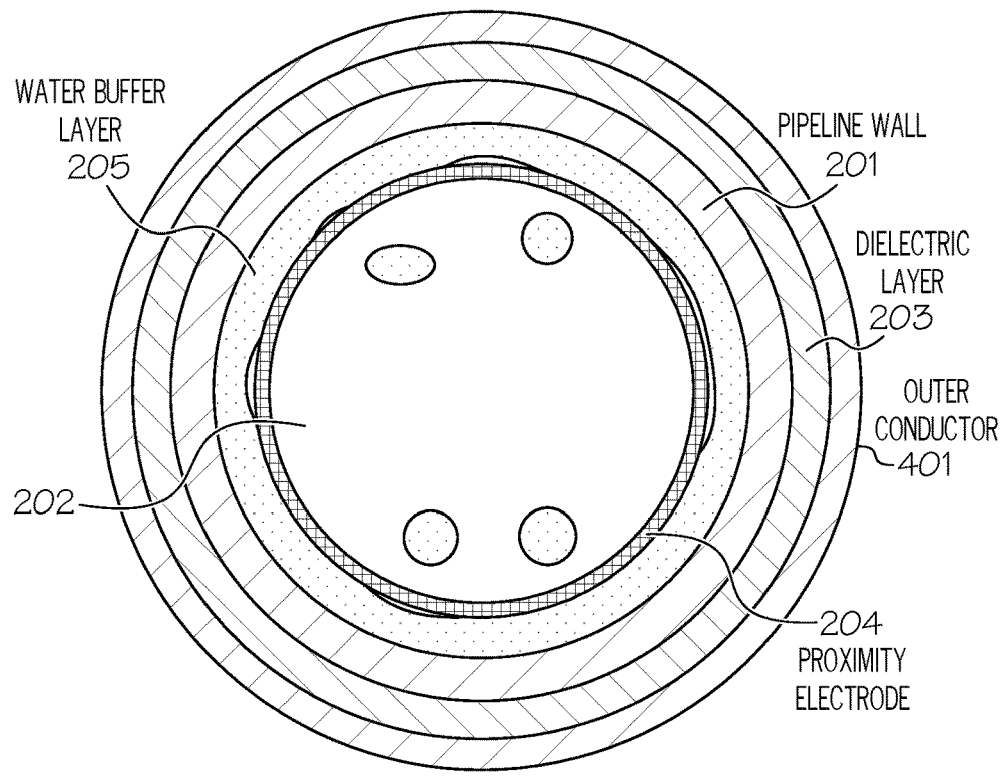
FIG. 4B illustrates protecting the pipeline internal walls from hydrocarbon fouling in accordance with an embodiment of the present invention.

An alternative method for preventing hydrocarbon fouling from an oil-water mixture is discussed below in connection with FIG. 3. FIG. 3 is an alternative method 300 for preventing hydrocarbon fouling from an oil-water mixture, where the dielectric layer is not required to be placed between the target surface and the hydrocarbon-water mixture, in accordance with an embodiment of the present invention. FIG. 3 will be discussed in conjunction with FIGS. 4A-4B, using the same element numbers for the same elements described in FIGS. 2A and 2B. FIG. 4A is a schematic illustrating an alternative embodiment in which the dielectric layer is not coated on the target internal surface, but instead, on the corresponding external surface in accordance with an embodiment of the present invention. FIG. 4B illustrates protecting the pipeline internal walls from hydrocarbon fouling in accordance with an embodiment of the present invention.

Referring now to FIG. 3, in conjunction with FIGS. 4A-4B, in step 301, an outer surface of a pipeline wall 201 is covered with a dielectric layer 203. In this manner, surface 201 to be protected can be in intimate contact with hydrocarbon-water mixture 202.

In step 302, dielectric layer 203 is covered with an external conducting (metallic) layer 401. In this manner, the side of dielectric layer 203 opposite pipeline wall 201 can be protected.

In step 303, an electrical potential difference is applied across dielectric layer 203 established by applying an electrical potential to a proximity electrode 204 immersed in a solution of the water-hydrocarbon mixture 202 and applying an electrical potential to external conducting layer 401.

In step 304, a buffer layer of water 205 is formed on top of an inner surface of pipeline wall 201 by electrically attracting water from water-hydrocarbon mixture 202 to buffer layer 205 by applying the potential difference across dielectric layer 203 thereby protecting surface 201 from fouling.

The embodiment shown in FIGS. 4A and 4B has clear benefits over the embodiment shown in FIGS. 2A and 2B. The embodiment of FIGS. 4A and 4B does not rely on dielectric layer deposition directly on the target surface (e.g., surface 201); this has benefits for antifouling applications for internal surfaces, like the insides of pipelines. Dielectric layer deposition on such internal surfaces is often a manufacturing challenge. Such surfaces can still be protected from hydrocarbon fouling by coating the corresponding external surfaces with the dielectric layer and then forming the water buffer layer as illustrated in FIGS. 4A and 4B. Other practical issues (e.g., dielectric degradation) associated with hydrocarbon-dielectric interaction are also completely avoided as dielectric layer 203 is never in intimate contact with liquid 202. The embodiment of FIGS. 4A and 4B also makes this technology very amenable to retrofitting existing equipment and pipelines since no changes to internal surfaces are needed (making changes to external surfaces is relatively easier and less expensive).

Figure 5:
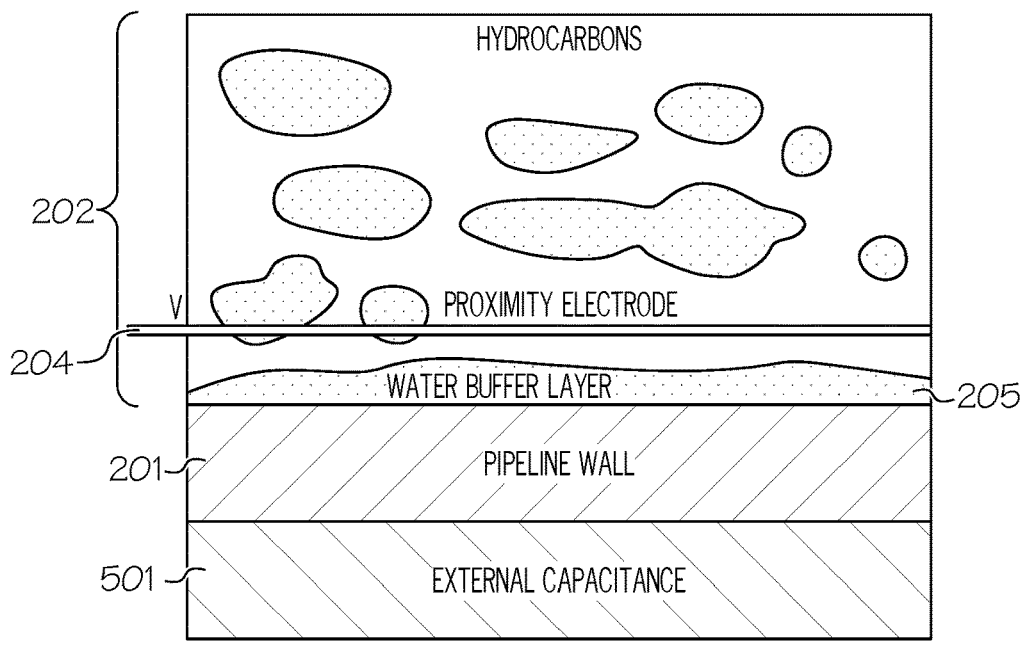
FIG. 5 is a schematic illustrating a further alternative embodiment in which the dielectric layer and the outer conducting layer are replaced with an external capacitance in accordance with an embodiment of the present invention.

A further alternative embodiment for preventing hydrocarbon fouling from an oil-water mixture is discussed below in connection with FIG. 5. FIG. 5 is a schematic illustrating a further alternative embodiment for preventing hydrocarbon fouling from an oil-water mixture in which the dielectric layer 203 and the outer conducting layer 401 of FIGS. 4A and 4B are replaced with an external capacitance 501 in accordance with an embodiment of the present invention. In this manner, a dielectric layer is no longer needed to be deposited to the inner or outer surface. The principles of the present invention as discussed above in connection with FIGS. 3 and 4A-4B apply to the embodiment of FIG. 5 except that a potential difference is applied across external capacitance 501 established by applying an electrical potential to proximity electrode 204 immersed in a solution of the water-hydrocarbon mixture 202 and applying an electrical potential to external capacitance 501. All the other aspects discussed above in connection with FIGS. 3 and 4A-4B apply to FIG. 5 and will not be reiterated for the sake of brevity.

Referring to FIG. 5, the capacitive action of a dielectric layer (either on the inside or outside) can be obtained by adding a solid state capacitor 501 to surface 201 to be protected. In one embodiment, capacitor 501 would be electrically connected in series to surface 201, and would have the same working action as the capacitance of a dielectric layer. As a result, such an embodiment is advantageous since the deposition and durability of dielectric layers can be expensive and often needs development of new manufacturing technologies. Also, the technical risks due to dielectric layer degradation are completely eliminated with this embodiment. Furthermore, capacitor 501 can be mounted far away from the actual surface 201 which makes this technology more practical in certain applications (e.g., boiler tubes, wherein having a capacitor mounted on a hot surface is not desirable). This embodiment of adding a solid state capacitor 501 has been tested and the obtained results are similar to the results obtained by a surface dielectric layer.

Figure 6:
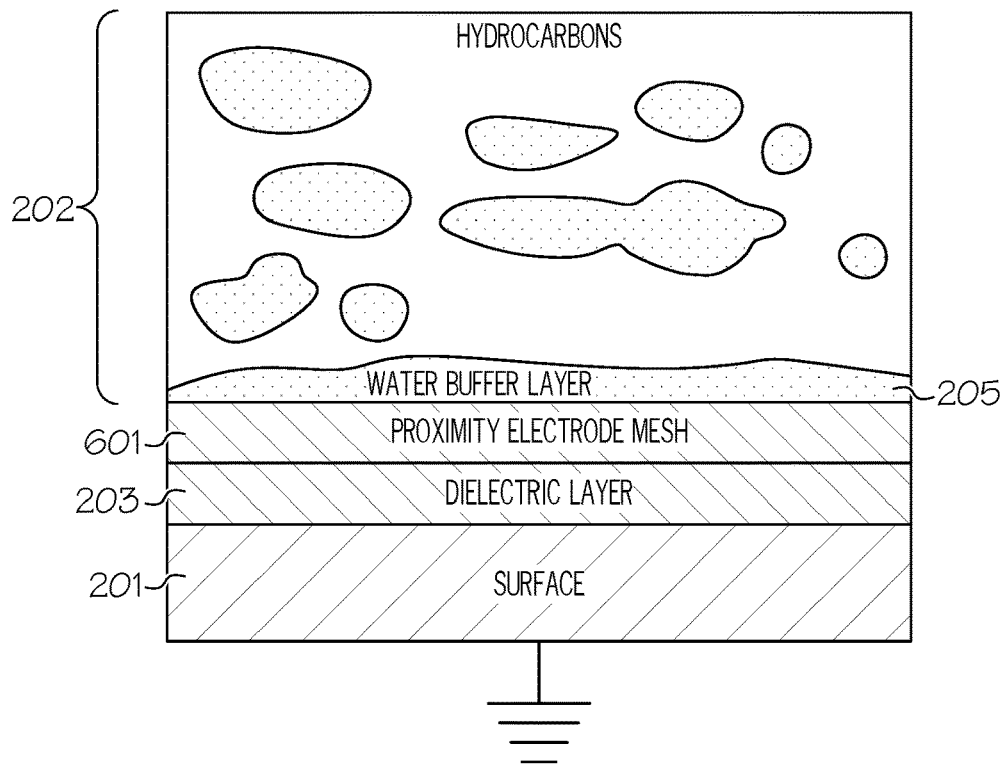
FIG. 6 illustrates the use of an electrode mesh sleeve along the surface of a pipeline as opposed to using a proximity electrode in accordance with an embodiment of the present invention.

A further alternative embodiment is to replace proximity electrode 204 of FIGS. 2A-2B, 4A, 4B and 5 with an electrode mesh sleeve along the pipeline as illustrated in FIG. 6.

FIG. 6 illustrates the use of an electrode mesh sleeve 601 along the surface of pipeline 201 as opposed to using proximity electrode 204 in accordance with an embodiment of the present invention. The use of an electrode mesh sleeve 601 is easier to implement than the use of a proximity electrode 204 and hence will aid in the implementation of this technology. As illustrated in FIG. 6, a potential difference is applied across dielectric layer 203 established by applying an electrical potential to electrode mesh sleeve 601 and applying an electrical potential to surface 201. As a result, a buffer layer 205 of water is formed on top of electrode mesh sleeve 601 by electrically attracting water from water-hydrocarbon mixture 202 to buffer layer 205. The externally applied voltage will selectively attract water from the water-hydrocarbon mixture 202 and maximize surface-water contact to form a water rich buffer layer 205 at surface 201.

While FIG. 6 illustrates the replacement of proximity electrode 204 in FIGS. 2A and 2B with electrode mesh sleeve 601, proximity electrode 204 may be replaced with the use of electrode mesh sleeve 601 in any of the embodiments discussed herein, including the embodiments of FIGS. 4A, 4B and 5.

Furthermore, the principles of the present invention can also be utilized to reduce the pumping power required to transport viscous oils through pipelines. The viscosity of certain heavy oils can be 1,000 times greater than the viscosity of water, which leads to very high pressure drop requirements and power consumption by the pipeline. By electrically forcing water to wet the surface (e.g., surface 201 of FIGS. 2A-2B, 4A-4B, 5 and 6), a buffer water layer (e.g., water buffer layer 205 of FIGS. 2B, 4A-4B, 5 and 6) can be created at the pipeline walls which will act as a lubricant for oil transport as shown in FIG. 7.

Figure 7:
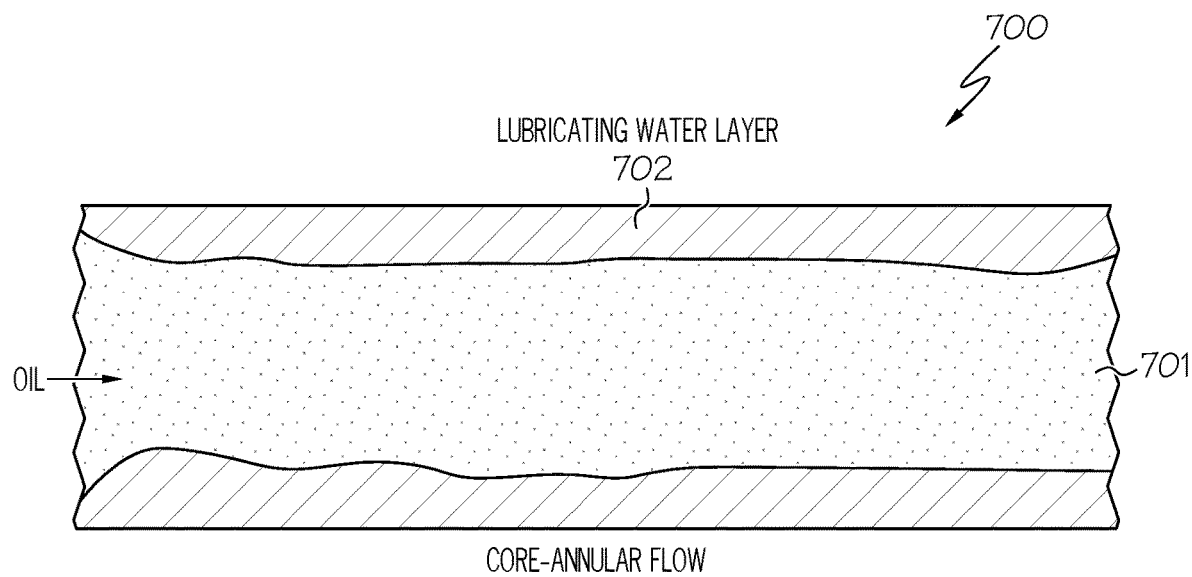
FIG. 7 illustrates the concept of core annular flow, where the viscous oil is transported as a core in a pipeline, surrounded in a lubricating layer of much less viscous water in accordance with an embodiment of the present invention.

FIG. 7 illustrates the concept of core annular flow, where viscous oil 701 is transported as a core in a pipeline 700, surrounded in a lubricating layer 702 of much less viscous water in accordance with an embodiment of the present invention. As illustrated in FIG. 7, pipeline 700 will still transport oil 701 in its core, but the pumping power will be substantially reduced because of the lubricating aspect of water layer 702. This concept of transporting oil in a water sheath is termed herein as "core annular flow." A practical challenge in present day core annular flow technology is the generation and maintenance of water buffer layers. The present invention can generate and maintain a stable water layer at the interface by keeping the interior walls of the pipeline water wetted using any of the three configurations depicted in FIGS. 2A-2B, 4A-4B, 5 and 6.

Figure 8:
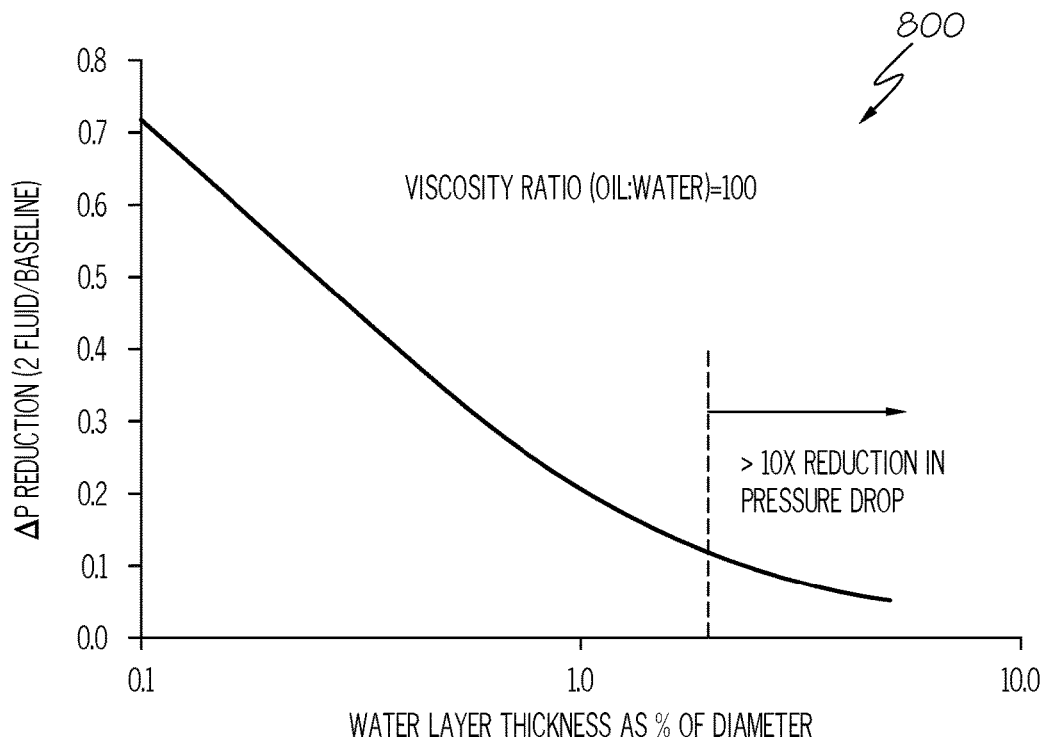
FIG. 8 is a graph illustrating the change in pressure drop versus the thickness of the water layer in accordance with an embodiment of the present invention.

Furthermore, by generating and maintaining a lubricating water layer at the wall to enable low pumping power transport of viscous oil, the pumping pressure drop can be reduced ≥10 times by using a core annular flow pumping scheme (water-oil) as compared with pumping of viscous oil alone as shown in FIG. 8. FIG. 8 is a graph 800 illustrating the change in pressure drop versus the thickness of the water layer (water layer 702 of FIG. 7) in accordance with an embodiment of the present invention. As illustrated in FIG. 8, in conjunction with FIG. 7, depending on the thickness of the lubricating water layer 702, significant reduction in pressure drop can be realized for the core annular flow (2 fluid) pumping scheme as compared to the baseline oil pumping scheme.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A transportation mechanism for transporting hydrocarbons, the mechanism comprises:
   a pipeline for transporting a water-hydrocarbon mixture;
   a dielectric layer covering an inner surface of said pipeline;
   an electrode mesh covering said dielectric layer, wherein a potential difference is applied across said dielectric layer established by applying an electrical potential to said electrode mesh and applying an electrical potential to said pipeline; and
   a buffer layer of water on top of said dielectric layer, wherein said water buffer layer comprises water electrically attracted from said water-hydrocarbon mixture by applying said potential difference across said dielectric layer, wherein said water buffer layer is located between said electrode mesh and said water-hydrocarbon mixture thereby eliminating hydrocarbon fouling on an inner surface of said pipeline.

2. The transportation mechanism as recited in claim 1, wherein hydrocarbons in said water-hydrocarbon mixture comprise one or more of the following: asphaltenes, waxes and hydrates.

* * * * *